United States Patent
Chiu et al.

(10) Patent No.: US 8,950,715 B2
(45) Date of Patent: Feb. 10, 2015

(54) SUPPORT APPARATUS

(76) Inventors: Mao-Tung Chiu, New Taipei (TW);
Daphne Su, New Taipei (TW)

( * ) Notice: Subject to any disclaimer, the term of this patent is extended or adjusted under 35 U.S.C. 154(b) by 392 days.

(21) Appl. No.: 13/454,199

(22) Filed: Apr. 24, 2012

(65) Prior Publication Data

US 2013/0277510 A1   Oct. 24, 2013

(51) Int. Cl.
*A45D 42/14*   (2006.01)
*G06F 1/16*   (2006.01)
*H05K 5/00*   (2006.01)

(52) U.S. Cl.
USPC ............ 248/126; 248/917; 248/918; 248/919; 248/920; 248/921; 248/922; 248/923; 248/309.3; 248/205.8; 248/188; 248/205.5; 248/205.6; 248/205.7; 248/206.1; 248/206.2; 248/206.3; 248/206.4; 248/537; 248/363; 248/371; 248/398; 361/679.06; 361/679.3

(58) Field of Classification Search
USPC ........... 248/126, 917–923, 309.3, 205.8, 188, 248/205.5–205.7, 206.1–206.4, 537, 363, 248/371, 398; 361/679.06, 679.3
See application file for complete search history.

(56) References Cited

U.S. PATENT DOCUMENTS

| | | | |
|---|---|---|---|
| 7,815,155 B2* | 10/2010 | Hung ......................... | 248/205.5 |
| 7,913,963 B2* | 3/2011 | Cheng et al. ............... | 248/205.5 |
| 8,520,838 B1* | 8/2013 | Madden ...................... | 379/455 |
| 2008/0197250 A1* | 8/2008 | Kaneda et al. ............. | 248/206.3 |
| 2009/0108153 A1* | 4/2009 | Hung ......................... | 248/205.8 |
| 2009/0294609 A1* | 12/2009 | Riddiford et al. .......... | 248/206.2 |
| 2011/0025176 A1* | 2/2011 | McClure et al. ........... | 312/223.2 |
| 2012/0182680 A1* | 7/2012 | Wetzel et al. .............. | 361/679.06 |

* cited by examiner

*Primary Examiner* — Christopher Garft
(74) *Attorney, Agent, or Firm* — Alan D. Kamrath; Kamrath IP Lawfirm, P.A.

(57) ABSTRACT

A support apparatus has a positioning disc mounted on a sucking disc. An operation disc is mounted on the positioning disc and has a receiving hole. Two bevel ribs are arc-shaped, are formed on and protrude along an inner wall of the receiving hole. The sucking disc has a column mounted through the positioning disc and the receiving hole of the operation disc. A pin is mounted through the column, with two ends of the pin protruding beyond the column and abutting against the two bevel ribs of the operation disc. By rotating the operation disc to axially move the pin upon abutting against the bevel ribs to pull the sucking disc, the sucking disc can be adhered to a tablet PC. A pivotable stand connected to the positioning disc can be rested on a desk to facilitate viewing at any angle.

19 Claims, 11 Drawing Sheets

SUPPORT APPARATUS

BACKGROUND OF THE INVENTION

1. Field of the Invention

The present invention relates to a support apparatus and, more particularly, to a support apparatus mountable on or dismountable from a predetermined location through a simple operation.

2. Description of the Related Art

To keep up with the constant technological development, computer manufacturers have launched a niche product, tablet personal computers (PC), between smart phones and notebook computers. In contrast to smart phones, the tablet PCs have larger screens facilitating users' browsing web pages, watching films and the like. As the tablet PCs employ touch panels as their input devices, the keyboards equipped by notebook computers therefore become unnecessary. Hence, the tablet PCs have the advantage over the notebook computers as far as portability is concerned.

Most current tablet PC users hold the tablet PCs with hands or rest them on desktops. However, doing so results in the following disadvantages. When users intend to watch films through the tablet PCs or to perform long-hour work, maintaining the hand-holding gesture for a long period of time oftentimes causes sore hands. Although putting the tablet PCs on desktops can get rid of the issue of sore hands, the tradeoff is neck discomfort, such as pain, stiffness and the like, when users need to bow their heads for a long time to watch the screens of the tablet PCs.

SUMMARY OF THE INVENTION

An objective of the present invention is to provide a support apparatus mountable on or dismountable from a predetermined location through a simple operation.

To achieve the foregoing objective, the support apparatus has a sucking disc, a limiting shield, a positioning disc, a stand and an operation disc.

The sucking disc has a column and a through hole. The column is formed on and protrudes from the sucking disc in a direction perpendicular to the sucking disc. A direction to which the column orients is defined as an axial direction. The through hole is formed through the column.

The limiting shield has a neck tube and two limit slots. The neck tube is hollow and is formed on and protrudes outwards from the limiting shield. The two limit slots are oppositely formed through the neck tube. The limiting shield is mounted on the sucking disc for the column of the sucking disc to be mounted in the neck tube and for the through hole to align with the limit slots of the neck tube.

The positioning disc has a tube hole formed through the positioning disc and mounted on the limiting shield for the neck tube to be mounted through the tube hole.

The stand is pivotally mounted on the positioning disc with a hinge.

The operation disc has a receiving hole, two bevel ribs and a pin. The receiving hole has an inner opening and an outer opening. The two bevel ribs are arc-shaped, are formed on and protrude along an inner wall of the receiving hole, and are adjacent to the inner opening of the receiving hole. Each bevel rib progressively increases in thickness in the axial direction from one end to the other end. The pin is mounted in the receiving hole of the operation disc by penetrating through the limiting slot of the limiting disc and the through hole of the column of the sucking disc, with two ends of the pin respectively protruding beyond the neck tube and the column and engaging the two bevel ribs, so that the operation disc is rotatably positioned on the positioning disc.

The support apparatus is advantageous in that rotating the operation disc can alter the positions of the two ends of the pin upon abutting against the bevel ribs, so that the sucking disc generates a sucking force for itself to be adhered to a tablet PC, and in that the stand is pivotable relative to the positioning disc, so that the stand can be mounted on a desk and facilitate the tablet PC's being viewed at an angle with comfort. Additionally, the position disc and the stand are pivotable relative to the limiting shield for a tablet PC mounted with the support apparatus to be used in a landscape mode or a portrait mode, thereby enhancing operational convenience of the tablet PC.

Other objectives, advantages and novel features of the invention will become more apparent from the following detailed description when taken in conjunction with the accompanying drawings.

DETAILED DESCRIPTION OF THE INVENTION

Figure 1:
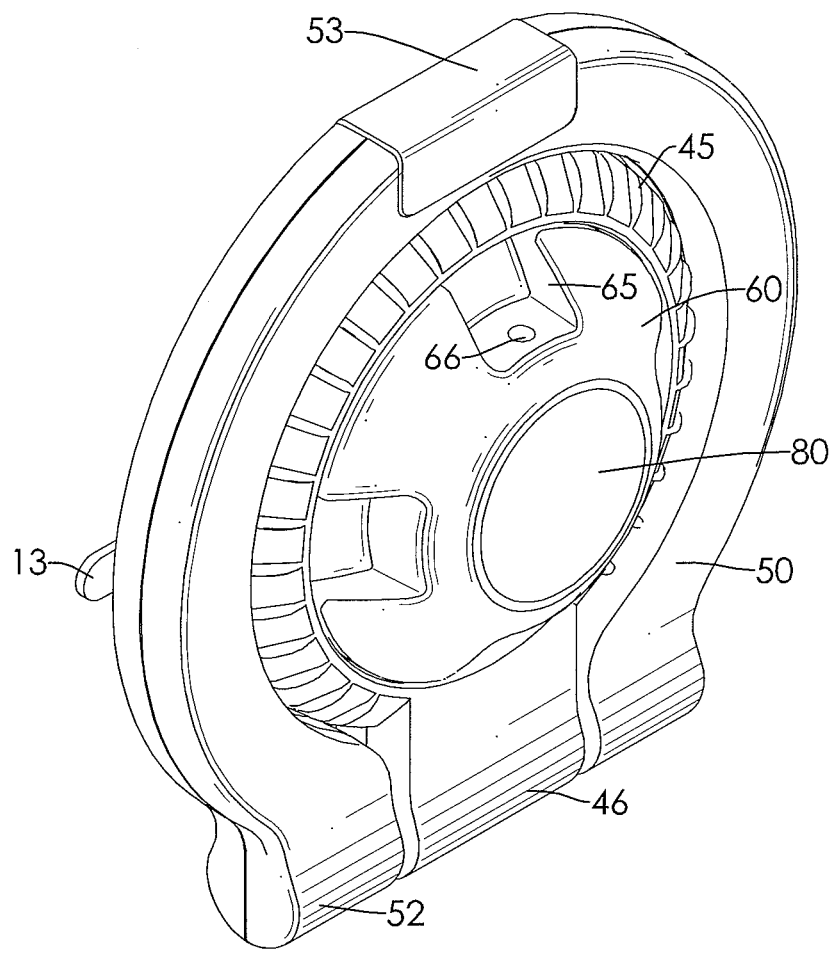
FIG. 1 is a perspective view of a support apparatus in accordance with the present invention.
Figure 2:
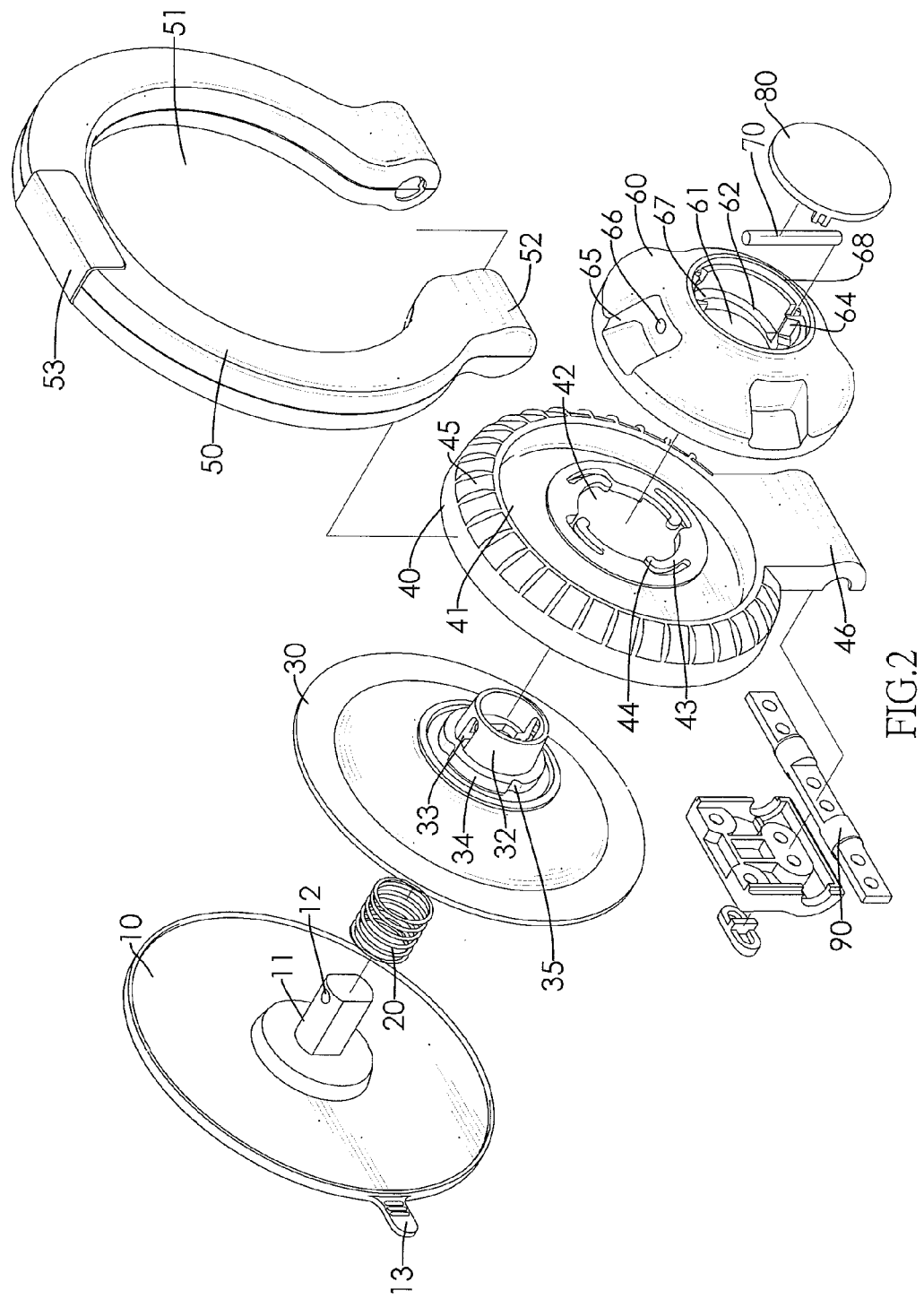
FIG. 2 is an exploded perspective view of the support apparatus in FIG. 1.
Figure 3:
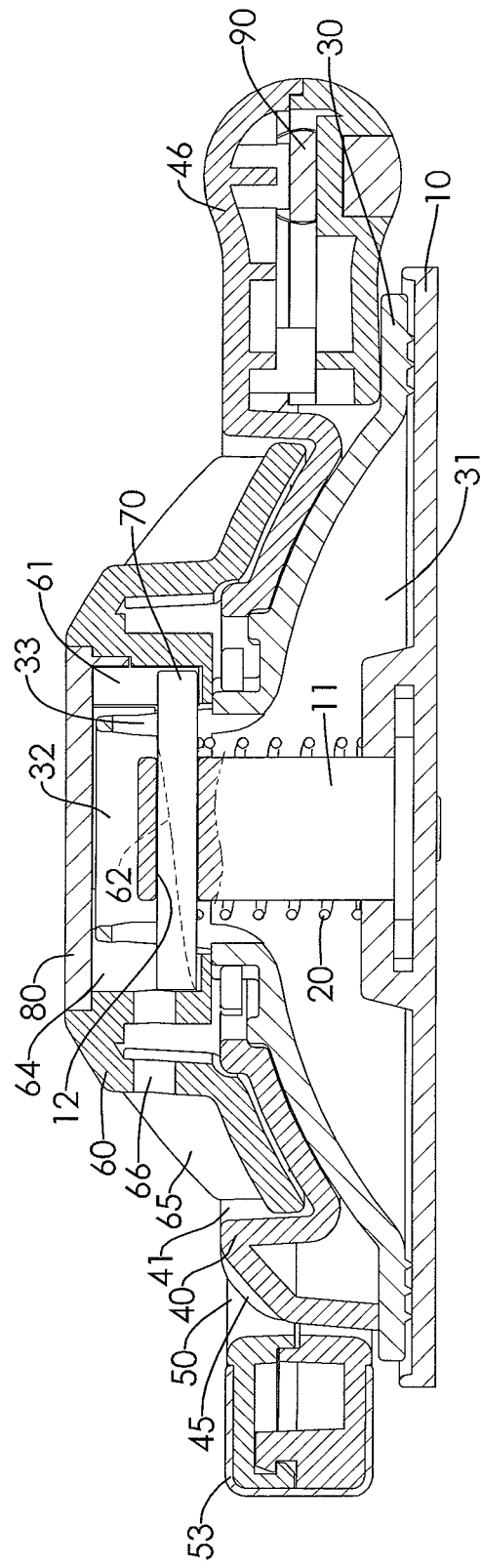
FIG. 3 is an enlarged side view in partial section of the support apparatus in FIG. 1.

With reference to FIGS. 1 to 3, a support apparatus in accordance with the present invention has a sucking disc 10, a spring 20, a limiting shield 30, a positioning disc 40, a stand 50, an operation disc 60, a pin 70 and a cover 80.

The sucking disc 10 has an inner side, an outer side, a column 11 and an ear 13. The column 11 is centrally formed on and protrudes from the outer side of the sucking disc 10 in a direction perpendicular to the sucking disc 10, and has a first through hole 12 radially formed through the column 11. A direction to which the column 11 orients is defined as an axial direction. The ear 13 is formed on and protrudes from a rim of the sucking disc 10.

The spring 20 is mounted around the column 11 of the sucking disc 10.

The limiting shield 30 is bowl-shaped and has an inner chamber 31 as shown in FIG. 3, and has a neck tube 32 and an annular flange 34. The neck tube 32 is hollow and is centrally formed on and protrudes outwards from the limiting shield 30. An inner space of the neck tube 32 communicates with the inner chamber 31. The neck tube 32 has two limit slots 33 oppositely formed through the neck tube 32. The annular flange 34 is formed on an outer side of the limiting shield 30 and formed around the outer periphery of the neck tube 32, and has a cylindrical surface and four engagement indentations 35 separately formed in the cylindrical surface. The limiting shield 30 is mounted on the outer side of the sucking disc 10, so that the column 11 of the sucking disc 10 is mounted inside the neck tube 32 and so that the first through hole 12 of the column 11 aligns with the limit slots 33.

The positioning disc 40 has an inner side, an outer side, a circular recess 41, four resilient arms 43, multiple anti-slip bumps 45 and a pivoting part 46. The circular recess 41 is centrally formed in the outer side of the positioning disc 40 and has a tube hole 42 centrally formed through a wall of the circular recess 41 facing the outer side of the positioning disc 40 and has an opening. The four resilient arms 43 are formed on an inner wall of the tube hole 42 and protrude along the opening of the tube hole 42. Each resilient arm 43 has a hook portion 44 formed on a free end of the resilient arm 43. The anti-slip bumps 45 are annularly formed on an edge portion of the outer side of the positioning disc and around the circular recess 41. The pivoting part 46 is formed on and protrudes from a rim of the positioning disc 40. The positioning disc 40 is mounted on the outer side of the limiting shield 30, so that the neck tube 32 of the limiting shield 30 is mounted through the tube hole 42 of the positioning disc 40.

Figure 4:
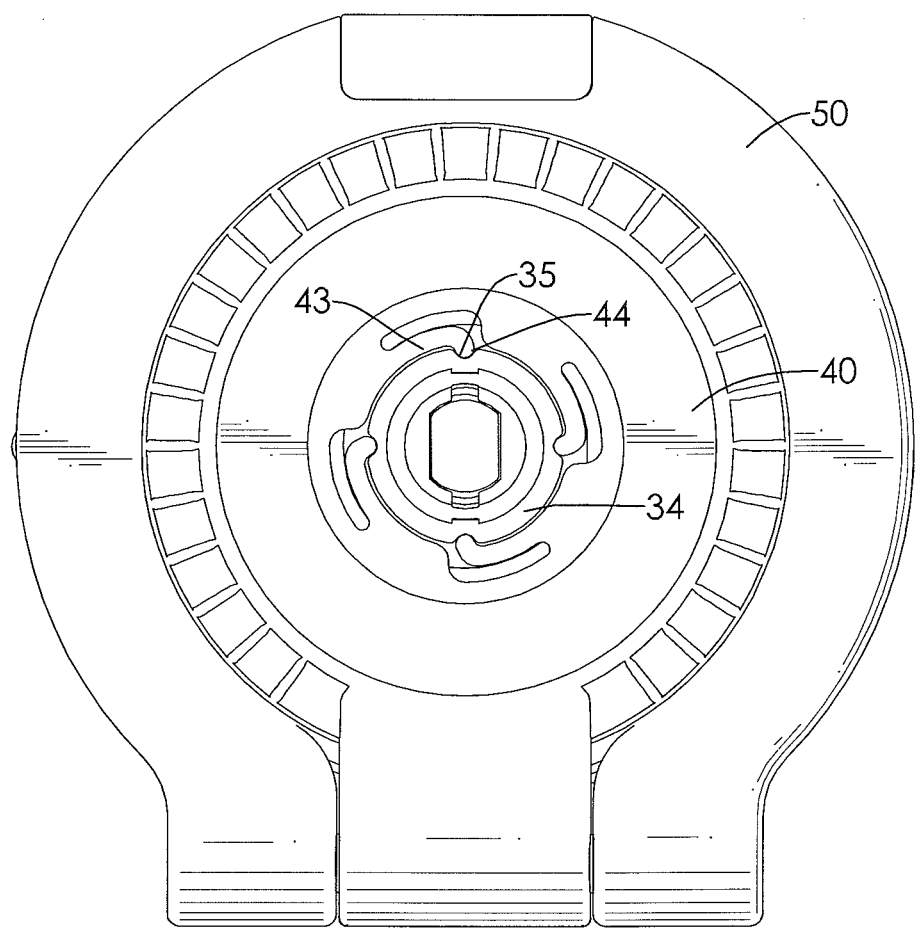
FIG. 4 is a front view of the support apparatus in FIG. 1 without an operation disc and a cover.

With reference to FIG. 4, the hook portion 44 of each resilient arm 43 of the positioning disc 40 engages one of the engagement indentations 35 on the annular flange 34 of the limiting shield 30. The positioning disc 40 can rotate with respect to the limiting shield 30, so that the hook portion 44 of each resilient arm 43 disengages from a corresponding engagement indentation 35. Each 90-degree rotation of the positioning disc 40 with respect to the limiting shield 30 allows the hook portion 44 of each resilient arm 43 of the positioning disc 40 to engage a corresponding engagement indentation 35 on the annular flange 34 of the limiting shield 30, so that the positioning disc 40 and the limiting shield 30 can be positioned relative to each other.

With reference to FIG. 2, the stand 50 is C-shaped, and has an inner space 51, two pivoting ends 52 and an anti-slip pad 53. The anti-slip pad 53 is mounted on a middle portion of the stand 50. The stand 50 is mounted around the positioning disc 40 to receive the positioning disc 40 within the inner space 51. The pivoting part 46 of the positioning disc 40 is mounted between the two pivoting ends 52 by using a hinge 90 securely connected with the pivoting part 46 of the positioning disc 40 and the pivoting ends 52, so that the stand 50 is pivotable relative to the positioning disc 40.

Figure 5:
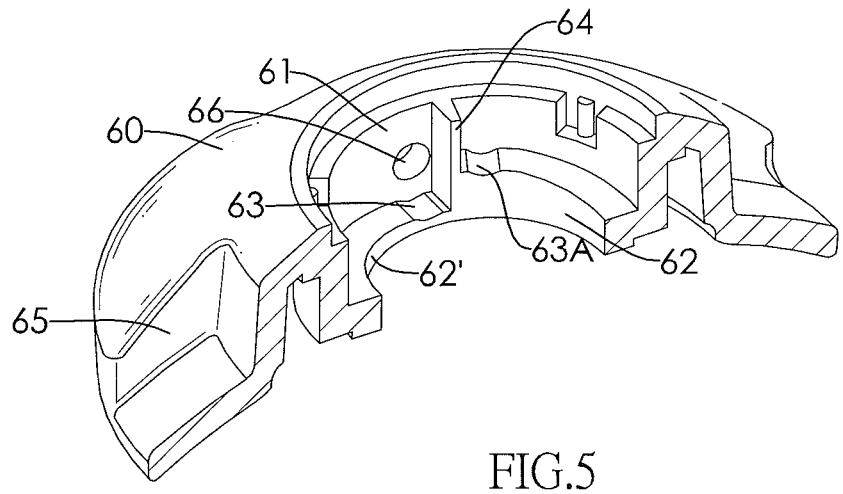
FIG. 5 is a perspective view in partial section of an operation disc of the support apparatus in FIG. 1.
Figure 6:
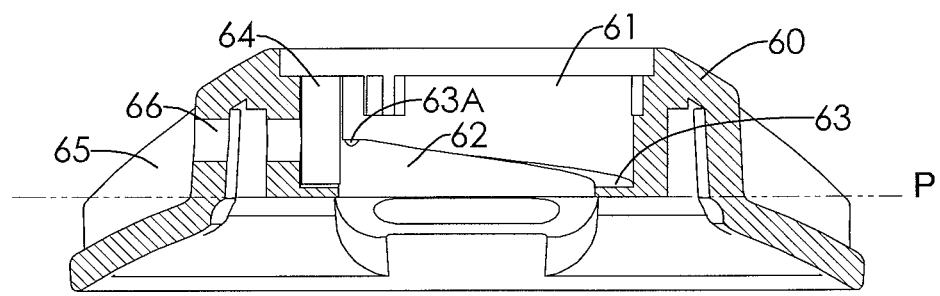
FIG. 6 is a side view in partial section of the operation disc in FIG. 5.

The operation disc 60 has an inner side, an outer side, a receiving hole 61, a first bevel rib 62, a second bevel rib 62', two stoppers 64, multiple operation recesses 65 and a second through hole 66. The receiving hole 61 has an inner opening 67 and an outer opening 68. With reference to FIGS. 5 and 6, the first and second bevel ribs 62, 62' are arc-shaped, are formed on and protrude along an inner wall of the receiving hole 61 and are adjacent to the inner opening of the receiving hole 61. Each of the first and second bevel ribs 62, 62' has a thin end and a thick end and increases in thickness in the axial direction from the thin end to the thick end. With further reference to FIG. 6, the first and second bevel ribs 62, 62' progressively increase in thickness relative to a reference plane P from the thin end to the thick end. The thin end and the thick end of the first bevel rib 62 are respectively adjacent to the thick end and the thin end of the second bevel rib 62'. Each of the first and second bevel ribs 62, 62' has a slanted surface, a low positioning indentation 63 and a high positioning indentation 63A. The slanted surface faces the outer opening of the receiving hole 61. The low positioning indentation 63 is formed in the thin end of each of the first and second bevel ribs 62, 62'. The high positioning indentation 63A is formed in the thick end of each of the first and second bevel ribs 62, 62'. The two stoppers 64 are formed on the inner wall of the receiving hole 61 and are respectively located on an intersection of the thin end of the first bevel rib 62 and the thick end of the second bevel rib 62' and on an intersection of the thick end of the first bevel rib 62 and the thin end of the second bevel rib 62'. The operation recesses 65 are separately formed in the outer side of the operation disc 60 and arranged around the receiving hole 61. The second through hole 66 is radially formed through one of the operation recesses 65 and communicates with the receiving hole 61. The operation disc 60 is rotatably mounted in the circular recess 41 of the positioning disc 40, and the neck tube 32 of the limiting shield 30 is mounted in the receiving hole 61 of the operation disc 60.

Figure 7:
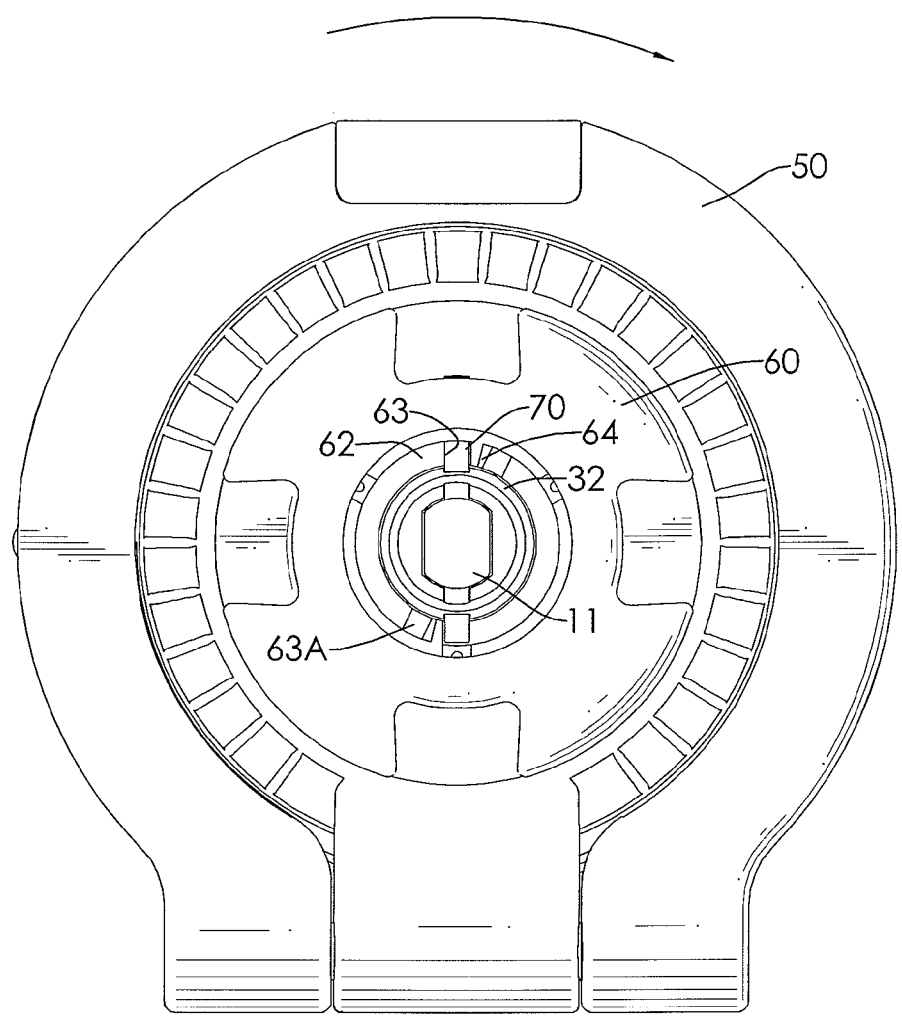
FIG. 7 is an operational front view of the support apparatus in FIG. 1.

With reference to FIGS. 3 and 7, the pin 70 is shorter than a diameter of the receiving hole 61 of the operation disc 60, and is mounted in the receiving hole 61 of the operation disc 60 by sequentially penetrating through the second through hole 66, the receiving hole 61 of the operation disc 60, the limit slots 33 of the limiting shield 30 and the first through hole 12 of the column 11 of the sucking disc 10. Two ends of the pin 70 respectively protrude beyond the neck tube 32 and the column 11 and engage the low positioning indentations 63 of the first and second bevel ribs 62, 62'. Thus, the operation disc 60 can be rotatably positioned within the circular recess 41 of the positioning disc 40, the sucking disc 10 is axially movable, and two ends of the spring 20 respectively abut against the outer side of the sucking disc 10 and the pin 70.

The cover 80 is mounted on the outer opening of the receiving hole 61 of the operation disc 60, and has an outer side for a brand name and logo to be printed thereon.

Figure 8:
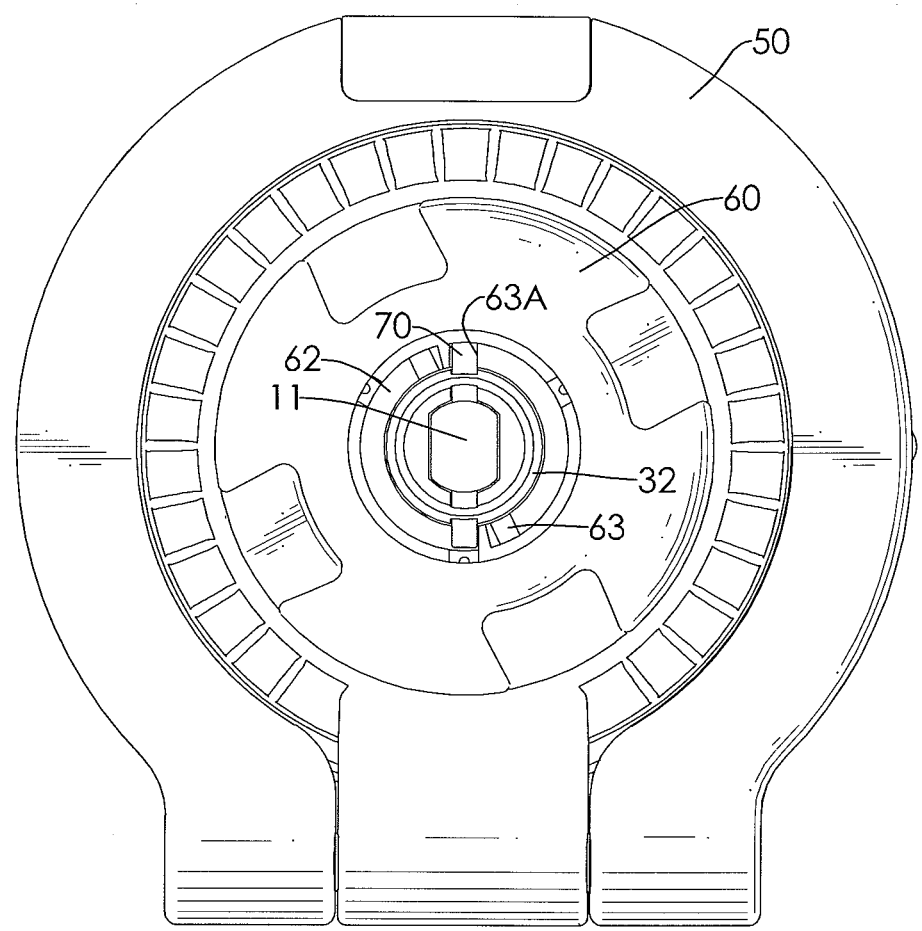
FIG. 8 is another operational front view of the support apparatus in FIG. 1.
Figure 9:
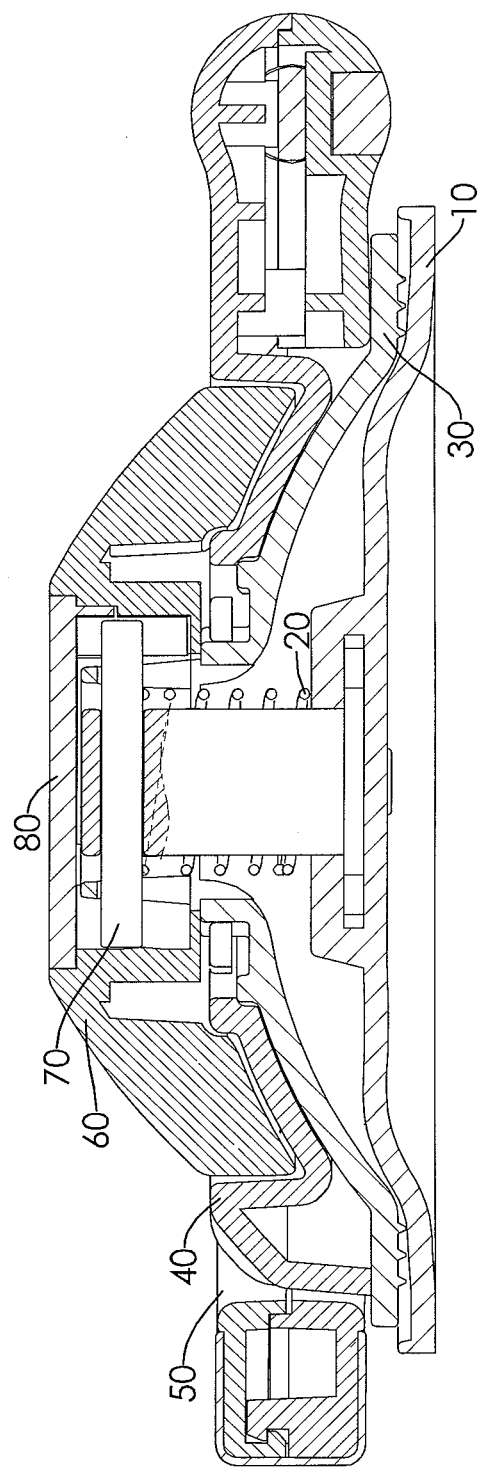
FIG. 9 is an enlarged operational side view in partial section of the support apparatus in FIG. 1.
Figure 10:
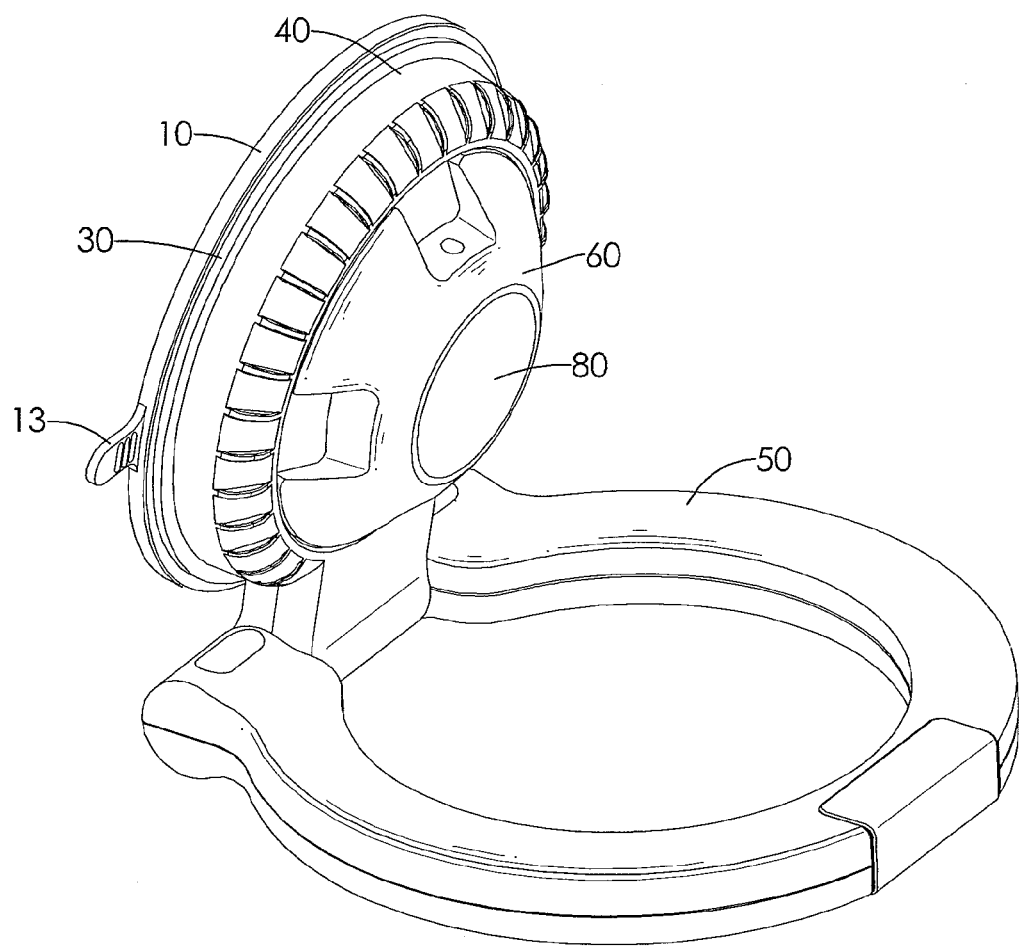
FIG. 10 is an operational perspective view of the support apparatus in FIG. 1.

When the support apparatus is mounted to an object to be supported, the inner side of the sucking disc 10 is first attached to the object, and the operation disc 60 is further rotated. Thus, the slanted surfaces of the first and second bevel ribs 62, 62' respectively push two ends of the pin 70, and the pin 70 is axially moved inside the operation disc 60 to pull the sucking disc 10. With reference to FIGS. 8 and 9, the operation disc 60 can be continuously rotated until both ends of the pin 70 respectively engage the high positioning indentations 63A of the first and second bevel ribs 62, 62'. A vacuum sucking force is generated on the inner side of the sucking disc 10 for the object to be supported to be attracted and affixed on the sucking disc 10. A restoring force of the spring 20 pushes the sucking disc 10 to generate more sucking force on the sucking disc 10. With reference to FIG. 10, the stand 50 is pivoted relative to the positioning disc 40 for the support apparatus to stand. When the support apparatus is dismounted, the operation disc 60 is rotated for the pin 70 to be axially moved inside the operation disc 60 and for both ends of the pin 70 to engage the low positioning indentations 63 of the operation disc 60. The sucking disc 10 then releases its sucking force. The ear 13 of the sucking disc 10 is pulled to remove the support apparatus. The support apparatus can be mounted or dismounted through the simple operation as described.

Figure 11:
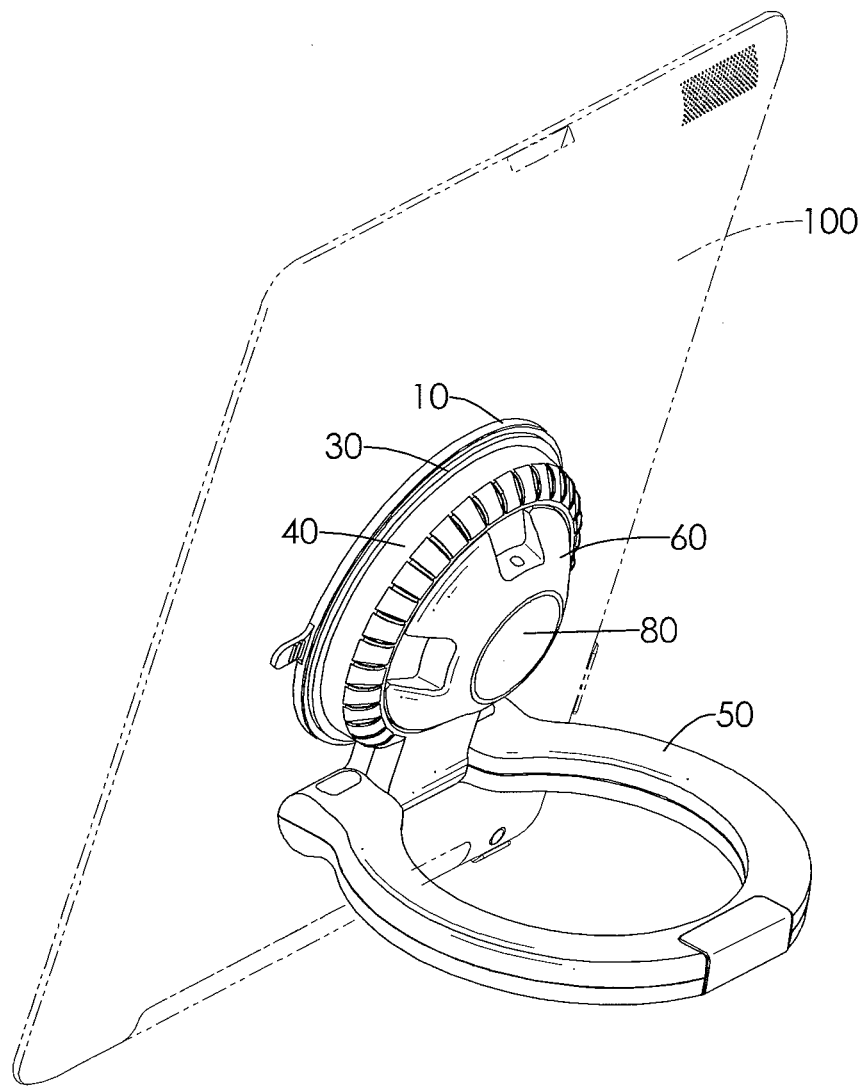
FIG. 11 is an operational perspective view of the support apparatus in FIG. 10 applied to support a tablet PC.
Figure 12:
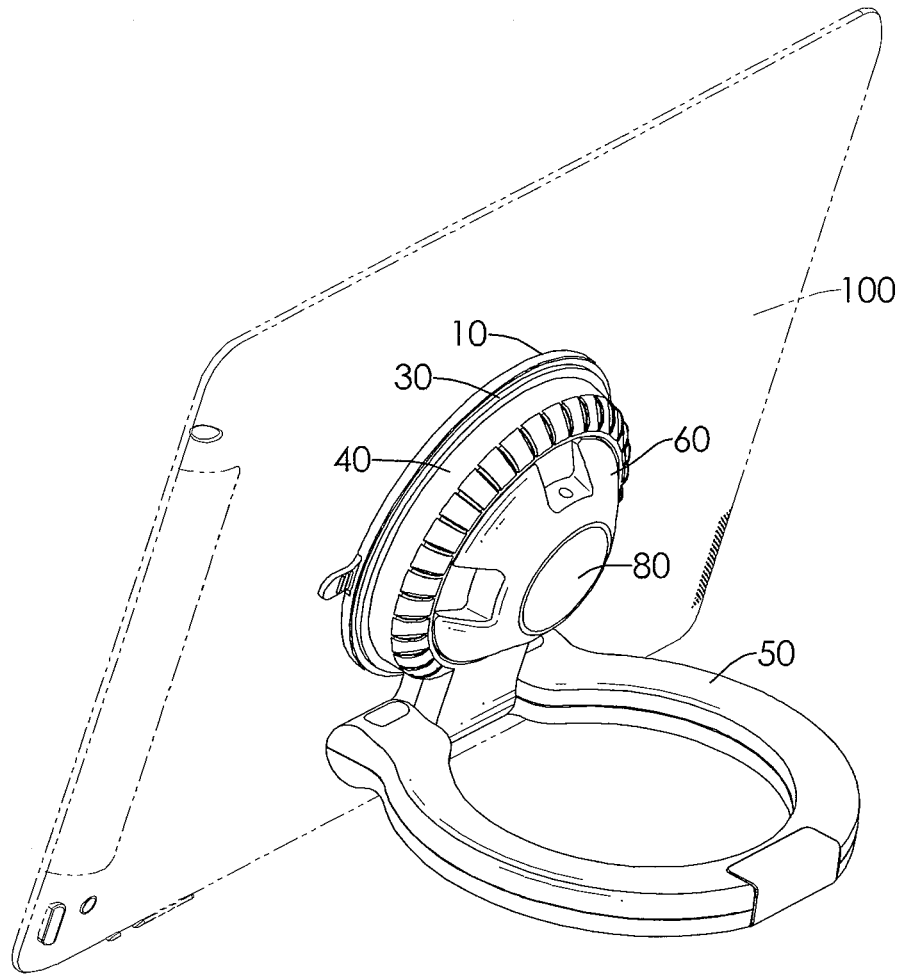
FIG. 12 is another operational perspective view of the support apparatus in FIG. 10 applied to support a tablet PC.

With reference to FIGS. 11 and 12, the support apparatus is adhered to a rear of a tablet PC 100, so that the tablet PC 100 can be supported on a desk and inclined at any angle for viewing comfort. The positioning disc 40 and the stand 50 can be rotated relative to the limiting shield 30 to orient the tablet PC 100 in a landscape mode or a portrait mode, and the stand 50 is rested on the desk to support the tablet PC 100. The support apparatus can be also adhered to ceramic tiles in a bathroom for hanging a towel and other personal sanitary supplies on the stand 50. Accordingly, the support apparatus of the present invention provides better operational convenience and flexibility.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A support apparatus comprising:
   a sucking disc having:
      a column formed on and protruding from the sucking disc in a direction perpendicular to the sucking disc, wherein a direction to which the column orients is defined as an axial direction, and
      a through hole formed through the column;
   a limiting shield has:
      a neck tube being hollow and formed on and protruding outwards from the limiting shield;
      two limit slots oppositely formed through the neck tube;
      an annular flange formed on an outer side of the limiting shield and formed around an outer periphery of the neck tube;
      a cylindrical surface; and
      four engagement indentations separately formed in the cylindrical surface, wherein the limiting shield is mounted on the sucking disc for the column of the sucking disc to be mounted in the neck tube and for the through hole to align with the two limit slots of the neck tube;
   a positioning disc having a tube hole formed through the positioning disc and mounted on the limiting shield for the neck tube to be mounted through the tube hole, wherein the positioning disc has four resilient arms formed on an inner wall of the tube hole and protruding along an opening of the tube hole, with each resilient arm having a hook portion formed on a free end of the resilient arm and engaging one of the engagement indentations on the annular flange of the limiting shield;
   a stand pivotally mounted on the positioning disc with a hinge; and
   an operation disc having:
      a receiving hole having an inner opening and an outer opening;
      two bevel ribs being arc-shaped, formed on and protruding along an inner wall of the receiving hole, and being adjacent to the inner opening of the receiving hole, wherein each bevel rib has a thin end and a thick end and progressively increases in thickness in the axial direction from the thin end to the thick end; and
      a pin mounted in the receiving hole of the operation disc by penetrating through the two limit slots of the limiting shield and the through hole of the column of the sucking disc with two ends of the pin respectively protruding beyond the neck tube and the column and engaging the two bevel ribs with the operation disc rotatably positioned on the positioning disc.

2. The support apparatus as claimed in claim 1, wherein: each bevel rib has:
   a slanted surface facing the outer opening of the receiving hole; and
   a low positioning indentation and a high positioning indentation respectively formed in the thick and thin ends of each bevel rib; and
   the two ends of the pin respectively engage the low positioning indentations or the high positioning indentations.

3. The support apparatus as claimed in claim 2 further comprising a spring mounted around the column of the sucking disc with two ends of the spring respectively abutting against an outer side of the sucking disc and the pin.

4. The support apparatus as claimed in claim 3, wherein:
   the positioning disc has a pivoting part formed on and protruding from a rim of the positioning disc; and
   the stand is C-shaped and has:
      an inner space; and
      two pivoting ends;
   wherein the stand is mounted around the positioning disc to receive the positioning disc within the inner space, wherein the pivoting part of the positioning disc is mounted between the two pivoting ends by using a hinge securely connected with the pivoting part of the positioning disc and the pivoting ends, wherein the stand is pivotable relative to the positioning disc.

5. The support apparatus as claimed in claim 2, wherein:
   the positioning disc has a pivoting part formed on and protruding from a rim of the positioning disc; and
   the stand is C-shaped and has:
      an inner space; and
      two pivoting ends;
   wherein the stand is mounted around the positioning disc to receive the positioning disc within the inner space, wherein the pivoting part of the positioning disc is mounted between the two pivoting ends by using a hinge securely connected with the pivoting part of the positioning disc and the pivoting ends, wherein the stand is pivotable relative to the positioning disc.

6. The support apparatus as claimed in claim 2, wherein the sucking disc has an ear formed on and protruding from a rim of the sucking disc.

7. The support apparatus as claimed in claim 1 further comprising a spring mounted around the column of the sucking disc with two ends of the spring respectively abutting against an outer side of the sucking disc and the pin.

8. The support apparatus as claimed in claim 7, wherein
   the positioning disc has a pivoting part formed on and protruding from a rim of the positioning disc; and
   the stand is C-shaped and has:
      an inner space; and
      two pivoting ends;
   wherein the stand is mounted around the positioning disc to receive the positioning disc within the inner space, wherein the pivoting part of the positioning disc is mounted between the two pivoting ends by using a hinge securely connected with the pivoting part of the positioning disc and the pivoting ends, wherein the stand is pivotable relative to the positioning disc.

9. The support apparatus as claimed in claim 1, wherein:
   the positioning disc has a pivoting part formed on and protruding from a rim of the positioning disc; and
   the stand is C-shaped and has:
      an inner space; and
      two pivoting ends;
   wherein the stand is mounted around the positioning disc to receive the positioning disc within the inner space, wherein the pivoting part of the positioning disc is mounted between the two pivoting ends by using a hinge securely connected with the pivoting part of the positioning disc and the pivoting ends, wherein the stand is pivotable relative to the positioning disc.

10. The support apparatus as claimed in claim 1, wherein the sucking disc has an ear formed on and protruding from a rim of the sucking disc.

11. A support apparatus comprising:
a sucking disc having:
a column formed on and protruding from the sucking disc in a direction perpendicular to the sucking disc, wherein a direction to which the column orients is defined as an axial direction, and
a through hole formed through the column;
a limiting shield having:
a neck tube being hollow and formed on and protruding outwards from the limiting shield; and
two limit slots oppositely formed through the neck tube, wherein the limiting shield is mounted on the sucking disc for the column of the sucking disc to be mounted in the neck tube and for the through hole to align with the two limit slots of the neck tube;
a positioning disc having a tube hole formed through the positioning disc and mounted on the limiting shield for the neck tube to be mounted through the tube hole, wherein the positioning disc has a pivoting part formed on and protruding from a rim of the positioning disc;
a stand pivotally mounted on the positioning disc with a hinge, wherein the stand is C-shaped and has:
an inner space; and
two pivoting ends;
wherein the stand is mounted around the positioning disc to receive the positioning disc within the inner space, wherein the pivoting part of the positioning disc is mounted between the two pivoting ends by using a hinge securely connected with the pivoting part of the positioning disc and the pivoting ends, wherein the stand is pivotable relative to the positioning disc; and
an operation disc having:
a receiving hole having an inner opening and an outer opening;
two bevel ribs being arc-shaped, formed on and protruding along an inner wall of the receiving hole, and being adjacent to the inner opening of the receiving hole, wherein each bevel rib has a thin end and a thick end and progressively increases in thickness in the axial direction from the thin end to the thick end; and
a pin mounted in the receiving hole of the operation disc by penetrating through the two limit slots of the limiting shield and the through hole of the column of the sucking disc with two ends of the pin respectively protruding beyond the neck tube and the column and engaging the two bevel ribs with the operation disc rotatably positioned on the positioning disc.

12. The support apparatus as claimed in claim 11, wherein:
the limiting shield has:
an annular flange formed on an outer side of the limiting shield and formed around an outer periphery of the neck tube;
a cylindrical surface; and
four engagement indentations separately formed in the cylindrical surface;
wherein the positioning disc has four resilient arms formed on an inner wall of the tube hole and protruding along an opening of the tube hole, with each resilient arm having a hook portion formed on a free end of the resilient arm and engaging one of the engagement indentations on the annular flange of the limiting shield.

13. The support apparatus as claimed in claim 12 further comprising a spring mounted around the column of the sucking disc with two ends of the spring respectively abutting against an outer side of the sucking disc and the pin.

14. The support apparatus as claimed in claim 13, wherein:
the positioning disc has a pivoting part formed on and protruding from a rim of the positioning disc; and
the stand is C-shaped and has:
an inner space; and
two pivoting ends;
wherein the stand is mounted around the positioning disc to receive the positioning disc within the inner space, wherein the pivoting part of the positioning disc is mounted between the two pivoting ends by using a hinge securely connected with the pivoting part of the positioning disc and the pivoting ends, wherein the stand is pivotable relative to the positioning disc.

15. The support apparatus as claimed in claim 12, wherein:
the positioning disc has a pivoting part formed on and protruding from a rim of the positioning disc; and
the stand is C-shaped and has:
an inner space; and
two pivoting ends;
wherein the stand is mounted around the positioning disc to receive the positioning disc within the inner space, wherein the pivoting part of the positioning disc is mounted between the two pivoting ends by using a hinge securely connected with the pivoting part of the positioning disc and the pivoting ends, wherein the stand is pivotable relative to the positioning disc.

16. The support apparatus as claimed in claim 12, wherein the sucking disc has an ear formed on and protruding from a rim of the sucking disc.

17. The support apparatus as claimed in claim 11 further comprising a spring mounted around the column of the sucking disc with two ends of the spring respectively abutting against an outer side of the sucking disc and the pin.

18. The support apparatus as claimed in claim 17, wherein:
the positioning disc has a pivoting part formed on and protruding from a rim of the positioning disc; and
the stand is C-shaped and has:
an inner space; and
two pivoting ends;
wherein the stand is mounted around the positioning disc to receive the positioning disc within the inner space, wherein the pivoting part of the positioning disc is mounted between the two pivoting ends by using a hinge securely connected with the pivoting part of the positioning disc and the pivoting ends, wherein the stand is pivotable relative to the positioning disc.

19. The support apparatus as claimed in claim 11, wherein the sucking disc has an ear formed on and protruding from a rim of the sucking disc.

* * * * *